(12) United States Patent
Falke et al.

(10) Patent No.: US 6,316,514 B1
(45) Date of Patent: Nov. 13, 2001

(54) PRODUCTION OF SOUND-DAMPING AND ENERGY-ABSORBING POLYURETHANE FOAMS

(75) Inventors: Peter Falke, Schwarzheide; Inge Rotermund, Ortrand; Klaus Schmutzer, Odelzhausen; Kirsten Schmaler, Finsterwalde, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/577,859

(22) Filed: May 24, 2000

(30) Foreign Application Priority Data

May 29, 1999 (DE) ................................. 199 24 802

(51) Int. Cl.⁷ .................................................. C08G 18/14
(52) U.S. Cl. .................... 521/174; 252/182.27; 521/137; 521/159; 521/174; 521/914
(58) Field of Search ..................................... 521/137, 159, 521/174, 914; 252/182.27

(56) References Cited

U.S. PATENT DOCUMENTS 5,420,170 * 5/1995 Lutter et al. .......................... 521/174
5,814,676 * 9/1998 Jacobs et al. ......................... 521/174

* cited by examiner

*Primary Examiner*—John M. Cooney
(74) *Attorney, Agent, or Firm*—Fernando A. Borrego; Mary K. Cameron

(57) ABSTRACT

Sound-damping and energy-absorbing flexible PUR foams are produced by reacting organic and/or modified organic polyisocyanates (a) with a polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f).

18 Claims, No Drawings

PRODUCTION OF SOUND-DAMPING AND ENERGY-ABSORBING POLYURETHANE FOAMS

The present invention relates to a process for producing sound-damping and energy-absorbing polyurethane (PUR) foams by reacting organic and/or modified organic polyisocyanates (a) with a polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f), in which a specific polyetherol mixture is used.

The production of PUR by reacting organic polyisocyanates with compounds having at least two reactive hydrogen atoms, for example polyoxyalkylenepolyamines and/or preferably organic polyhydroxyl compounds, in particular polyetherols having molecular weights of, for example, from 300 to 6000, and, if desired, chain extenders and/or crosslinkers having molecular weights of up to about 400 in the presence of catalysts, blowing agents, flame retardants, auxiliaries and/or additives is known and has been described many times. A summary overview of the production of PUR is given, for example, in Kunststoffhandbuch, Volume VII, polyurethane, Carl-Hanser-Verlag, Munich, $1^{st}$ Edition 1966, edited by Dr. R. Vieweg and Dr. A. Höchtlen, and also 2nd Edition 1983 and $3^{rd}$ Edition 1993, edited by Dr. G. Oertel.

The main application area for cold-cure flexible foams is upholstery elements for the furniture industry and seat elements for the automobile industry. In addition, numerous flexible PUR foams are employed for sound-damping purposes, e.g. in automobile carpets.

The open-pored foam framework offers favorable prerequisites for airborne sound absorption. The damping behavior of the flexible foams which can be described, for example, by the loss factor $\eta$ is regarded in numerous documents as a parameter for optimizing the degree of sound damping. The loss factor $\eta$ $$\eta = W_1/2\pi W_r$$

indicates the proportion of sound which is irreversibly converted into heat during one oscillation period. High loss factors accordingly give a higher degree of sound damping.

Sound-absorbing flexible PUR foams are described in a series of documents.

Thus, DE-A-2751774 describes a sound-damping composite system based on a combination of rigid foam polyols and flexible foam polyols which contains a high proportion of fillers, which has an unfavorable effect on the weight per unit area of the workpiece.

Ep-A-433878 discloses carpet foams having viscoelastic properties. These comprise a specific combination of hydrophilic and hydrophobic polyols. These systems have a good sound absorption performance, but demix after a short time during storage unless they are permanently stirred. DE-A-3942330 likewise describes specific polyol mixtures for producing such viscoelastic foams.

Ep-A-331941 claims acoustic foams having a loss factor of >0.5. These foams are produced using a combination of specific hydrophilic and hydrophobic polyetherols. Sound-damping properties can, according to DE-A-4001044, be achieved by a combination of polyester alcohols and polyether alcohols. These systems have a very strong tendency to demix.

In selected cases, attempts have been made to obtain an adhesive surface character of the foam by special processing, in particular substantial undercrosslinking. Here, foaming is generally carried out at an index of from about 60 to 80. (The index indicates the equivalence ratio of the isocyanate component to the polyol component). Thus, DE-A-3710731 describes such a flexible foam having sound-insulating properties. These carpet elements, which are manufactured with relatively high bulk densities, are produced with an adhesive surface. The adhesive surface properties, which are achieved as a particular advantage, require foaming in an index range below 80, preferably about 70.

DE-A-4129666 uses mutually incompatible polyols which slowly demix. The foams are processed at indexes of <80, which can affect the mechanical properties.

The inventions disclosed in the prior art do allow the production of flexible foams having sound-damping properties but leave considerable room for improvement in this class of materials with regard to the properties and the processability. In particular, it has to be noted that the mechanical properties of the carpets are frequently unsatisfactory at the indexes of <80, frequently <70, required according to the prior art.

It is an object of the present invention to produce sound-damping, easy-to-process flexible PUR foams having a loss factor of >0.3.

We have found that this objective is achieved by employing a polyetherol mixture (b) comprising b1) at least one bifunctional to eight-functional polyetherol based on propylene oxide and/or butylene oxide and ethylene oxide, where the proportion of ethylene oxide, based on the total amount of alkylene oxide used, is more than 40% by weight, and having an OH number of from 20 to 1000 mg KOH/g and a proportion of primary OH groups of greater than 50%, with the proviso that b1) comprises at least one at least bifunctional polyetherol b1.1) having an OH number of from 20 to 100 mg KOH/g, b2) at least one bifunctional to six-functional polyetherol based on propylene oxide and/or butylene oxide and having an OH number of greater than 30 mg KOH/g and b3) at least one further polyetherol based on ethylene oxide and propylene oxide and having a proportion of primary OH groups of more than 25%, where the component b1) is used in a proportion of more than 30% by weight, based on the total weight of the polyetherol mixture (b), for producing the sound-damping and energy-absorbing PUR foams.

The present invention accordingly provides a process for producing sound-damping and energy-absorbing flexible polyurethane foams by reacting organic and/or modified organic polyisocyanates (a) with a polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f), wherein the polyetherol mixture (b) comprises b1) at least one bifunctional to eight-functional polyetherol based on propylene oxide and/or butylene oxide and ethylene oxide, where the proportion of ethylene oxide, based on the total amount of alkylene oxide used, is more than 40% by weight, and having an OH number of from 20 to 1000 mg KOH/g and a proportion of primary OH groups of greater than 50%, with the proviso that b1) comprises at least one at least bifunctional polyetherol b1.1) having an OH number of from 20 to 100 mg KOH/g, b2) at least one bifunctional to six-functional polyetherol based on propylene oxide and/or butylene oxide and having an OH number of greater than 30 mg KOH/g and b3) at least one further polyetherol based on ethylene oxide and propylene oxide and having a proportion of primary OH groups of more than 25%, where the component b1) is used in a proportion of more than 30% by weight, based on the total weight of the polyetherol mixture (b).

The invention further provides the sound-damping and energy-absorbing PUR foams produced by this process and provides for their use as energy absorbers, damping material and for filling hollow spaces.

In our investigations we surprisingly found that use of the specific polyetherol mixture according to the present invention makes it possible to produce flexible, sound-damping PUR foams which are easy to process and have a high loss factor of $\geq 0.3$, preferably from 0.30 to 1.5.

As regards the components used according to the present invention in the polyol mixture, the following may be said:

The constituent (b1) comprises at least one bifunctional to eight-functional polyetherol based on propylene oxide and/or butylene oxide and ethylene oxide and having an OH number of from 20 to 1000 mg KOH/g, preferably from 400 to 1000 mg KOH/g, and a proportion of primary OH groups of greater than 50%, preferably greater than 70%. The proportion of ethylene oxide in (b1) is, based on the total amount of alkylene oxide used, more than 40% by weight.

The component (b1) includes at least one at least bifunctional polyetherol b1.1) having an OH number of from 20 to 100 mg KOH/g.

In addition, one or more at least bifunctional polyetherols b1.2) having an OH number of from 40 to 250 mg KOH/g and/or one or more at least bifunctional polyetherols b1.3) having an OH number of from 400 to 1000 mg KOH/g and a proportion of ethylene oxide, based on the total weight amount of alkylene oxide used, of more than 70% by weight and a proportion of primary OH groups of more than 70% may also be present.

Examples are

As b1.1): polyetherols based on glycerol, trimethylolpropane or sorbitol as initiator substance. Owing to the ethylene oxide end block they have predominantly primary OH groups. Preference is given to using polyetherols initiated using glycerol or trimethylolpropane, particularly preferably glycerol.

As b1.2): polyetherols based on ethylene glycol or diethylene glycol as initiator substance. They preferably have primary OH groups in an approximate proportion of >70%. In particular, polyetherols based on ethylene oxide are used and particular preference is given to using polyethylene oxides.

As b1.3): polyetherols based on glycerol or trimethylolpropane, particularly preferably trimethylolpropane, as initiator substance, preference is given to using polyetherols having ethylene oxide contents of >70% by weight.

If a component b1.2) is used, it is used in a proportion of from 1 to 40% by weight, preferably from 5 to 15% by weight, based on the total weight of the polyetherol mixture (b).

If a component b1.3) is used, it is used in a proportion of from 1 to 20% by weight, preferably from 5 to 15% by weight, based on the total weight of the polyetherol mixture (b).

The total component (b1) comprising b1.1) and, if desired, b1.2) and/or b1.3) is used in a proportion of more than 30% by weight, preferably from 65 to 80% by weight, in each case based on the total weight of the polyetherol mixture (b).

The constituent (b2) comprises at least one bifunctional to six-functional, preferably bifunctional to tetrafunctional, polyetherol based on propylene oxide and/or butylene oxide and having an OH number of greater than 30 mg KOH/g.

Examples of suitable components (b2) are: polyetherols based on propylene glycol, dipropylene glycol or glycerol as initiator substance. They preferably have propylene oxide units in the chain. Preference is given to using polyetherols based on propylene glycol or glycerol.

The component (b2) is preferably used in a proportion of less than 40% by weight, particularly preferably from 5 to 20% by weight, in each case based on the total weight of the polyetherol mixture (b).

The constituent (b3) comprises one or more polyetherols based on ethylene oxide and propylene oxide and having a proportion of primary OH groups of more than 25%.

Examples of suitable components (b3) are: polyetherols based on glycerol, trimethylolpropane or sorbitol as initiator substance. They frequently have a block structure with an ethylene oxide end cap. Preference is given to using polyetherols initiated using glycerol or trimethylolpropane, particularly preferably glycerol.

The component (b3) is preferably used in a proportion of less than 40% by weight, particularly preferably less than 10% by weight and in particular from 1 to 6% by weight, in each case based on the total weight of the polyetherol mixture (b).

The polyetherols mentioned are prepared by known methods as are described by way of example further below.

The sound-damping and energy-absorbing flexible PUR foams of the present invention are produced by reacting organic and/or modified organic polyisocyanates (a) with the above-described polyetherol mixture (b) and, if desired, further compounds (c) bearing hydrogen atoms which are reactive toward isocyanates, in the presence of water and/or other blowing agents (d), catalysts (e) and, if desired, further auxiliaries and additives (f).

As regards the further starting components which can be used, the following details may be provided:

Suitable organic and/or modified organic polyisocyanates (a) are the aliphatic, cycloaliphatic, araliphatic and preferably aromatic polyfunctional isocyanates known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures. Particular preference is given to using mixtures of polyphenylpolymethylene polyisocyanate with MDI, with the proportion of 2,4'-MDI preferably being >30% by weight.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples of suitable modified isocyanates are: modified diphenylmethane 4,4'-diisocyanate, modified diphenylmethane 4,4'- and 2,4'-diisocyanate mixtures, modified crude MDI or tolylene 2,4- or 2,6-diisocyanate, organic, preferably aromatic polyisocyanates containing urethane groups and having NCO contents of from 43 to 15% by weight, preferably from 31 to 21% by weight, based on the total weight, for example reaction products with low molecular weight diols, triols, dialkylene glycols, trialkylene glycols or polyoxyalkylene glycols having molecular weights of up to 6000, in particular up to 1500, where these dialkylene or polyoxyalkylene glycols can be used individually or as mixtures. Examples which may be mentioned are: diethylene glycol, dipropylene glycol, polyoxyethylene, polyoxypropylene and polyoxypropylene-polyoxyethene glycols, triols and/or tetrols. Also suitable are prepolymers containing NCO groups, having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or crude MDI. Further modified isocyanates which have been found to be useful are liquid polyisocyanates containing carbodiimide groups and/or isocyanurate rings and having NCO contents of from 43 to 15% by weight, preferably from 31 to 21% by weight, based on the total weight, e.g. ones based on diphenylmethane 4,4'-, 2,4'- and/or 2,2'-diisocyanate and/or tolylene 2,4- and/or 2,6-diisocyanate.

The modified polyisocyanates can be mixed with one another or with unmodified organic polyisocyanates such as diphenylmethane 2,4'- and/or 4,4'-diisocyanate, crude MDI, tolylene 2,4- and/or 2,6-diisocyanate.

Organic polyisocyanates which have been found to be particularly useful and are therefore preferably employed are: mixtures of tolylene diisocyanates and crude MDI or mixtures of modified organic polyisocyanates containing urethane groups and having an NCO content of from 33.6 to 15% by weight, in particular ones based on tolylene diisocyanates, diphenylmethane 4,4'-diisocyanate, diphenylmethane diisocyanate isomer mixtures or crude MDI and in particular crude MDI having a diphenylmethane diisocyanate isomer content of from 30 to 80% by weight.

In addition to the above-described polyetherol mixture (b) used according to the present invention, it is possible to employ, if desired, further compounds (c) bearing hydrogen atoms which are reactive toward isocyanates.

Compounds used for this purpose are first and foremost compounds having at least two reactive hydrogen atoms. Use is advantageously made of ones having a functionality of from 2 to 8, preferably from 2 to 3, and a molecular weight of from 300 to 8000, preferably from 300 to 5000.

According to the present invention, preference is given to using polyols, in particular polyether polyols. In addition, it is possible, for example, to use polyetherpolyamines and/or further polyols selected from the group consisting of polyester polyols, polythioether polyols, polyesteramides, hydroxyl-containing polyacetals and hydroxyl-containing aliphatic polycarbonates or mixtures of at least two of the polyols mentioned. The hydroxyl number of the polyhydroxyl compounds is generally from 20 to 80 and preferably from 28 to 56.

The polyether polyols used in the components (b) and (c) are prepared by known methods, for example from one or more alkylene oxides having from 2 to 4 carbon atoms in the alkylene radical by anionic polymerization using alkali metal hydroxides such as sodium hydroxide or potassium hydroxide, or alkali metal alkoxides such as sodium methoxide, sodium ethoxide or potassium ethoxide or potassium isopropoxide as catalysts with addition of at least one initiator molecule containing from 2 to 8, preferably 2 or 3, reactive hydrogen atoms in bound form or by cationic polymerization using Lewis acids such as antimony pentachloride, boron fluoride etherate, etc., or bleaching earth as catalysts. For specific applications, it is also possible for monofunctional initiator substances to be incorporated in the polyether structure.

Examples of suitable alkylene oxides are tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Examples of suitable initiator molecules are: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, e.g. unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-toluenediamine and 4,4', 2,4'- and 2,2'-diaminodiphenylmethane. Further suitable initiator molecules are: alkanolamines such as ethanolamine, N-methylethanolamine and N-ethylethanolamine, dialkanolamines such as diethanolamine, N-methyldiethanolamine and N-ethyldiethanolamine and trialkanolamines such as triethanolamine, and ammonia. Preference is given to using polyhydric, in particular dihydric and/or trihydric, alcohols such as ethanediol, 1,2- and 2,3-propanediol, diethylene glycol, dipropylene glycol, 1,4-butanediol, 1,6-hexanediol, glycerol, trimethylolpropane and pentaerythritol.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, e.g. in a weight ratio of from 90:10 to 10:90, preferably from 70:30 to 30:70, advantageously in the abovementioned polyether polyols using methods similar to those described in the German patents 1111394, 1222669 (U.S. Pat. Nos. 3,304,273, 3,383,351, 3,523,093), 1152536 (GB 1040452) and 1152537 (GB 987618), and also polyether polyol dispersions which contain as dispersed phase, usually in an amount of from 1 to 50% by weight, preferably from 2 to 25% by weight: e.g. polyureas, polyhydrazides, polyurethanes containing bound tert-amino groups and/or melamine and are described, for example, in Ep-B-011752 (U.S. Pat. No. 4,304,708), U.S. Pat. No. 4,374,209 and DE-A-3231497.

The polyether polyols can be used individually or in the form of mixtures.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms, by customary methods. The organic polycarboxylic acids and/or derivatives and polyhydric alcohols are usually polycondensed in a molar ratio of 1:1–1.8, preferably 1:1.05–1.2, in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., under atmospheric pressure or under reduced pressure to the desired acid number which is advantageously less than 10, preferably less than 2.

The PUR foams can be produced with or without concomitant use of chain extenders and/or crosslinkers, but these are generally not necessary. As chain extenders and/or crosslinkers, use is made of diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, triethanolamine, diethanolamine, glycerol and trimethylolpropane and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for producing the PUR foams, they are advantageously used in an amount of up to 5% by weight, based on the weight of the polyol compounds.

As blowing agents (d), it is possible to use the chlorofluorocarbons (CFCs) and highly fluorinated and/or perfluorinated hydrocarbons generally known from polyurethane chemistry. However, the use of these materials is being greatly restricted or completely stopped for ecological reasons. Apart from HCFCs and HFCs, alternative blowing agents are, in particular, aliphatic and/or cycloaliphatic hydrocarbons, in particular pentane and cyclopentane, or acetals such as methylal. These physical blowing agents are usually added to the polyol component of the system, but it is also possible to add them to the isocyanate component or, as a combination, both to the polyol component and to the isocyanate component. They can also be used together with highly fluorinated and/or perfluorinated hydrocarbons in the form of an emulsion of the polyol component. If emulsifiers are employed, it is usual to use oligomeric acrylates which contain bound polyoxyalkylene and fluoroalkane radicals as side groups and have a fluorine content of from about 5 to 30% by weight. Such products are well known from plastics chemistry, e.g. from EP-A-351614.

The amount of blowing agent or blowing agent mixture used is from 1 to 25% by weight, preferably from 1 to 15% by weight, in each case based on the weight of the components (b) to (f).

It is also possible and, particularly in the case of flexible foam, customary to add water as blowing agent to the polyol component in an amount of from 0.5 to 15% by weight, preferably from 1 to 5% by weight, based on the weight of the components (b) to (f). The addition of water can be combined with the use of the other blowing agents described.

Catalysts (e) used for producing PUR foams are, in particular, compounds which strongly accelerate the reaction of the reactive hydrogen atoms, in particular hydroxyl-containing compounds, of components (b) and (c) with the organic, modified or unmodified polyisocyanates (a). Suitable catalysts are organic metal compounds, preferably organic tin compounds such as tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis (dimethylaminoethyl) ether, bis(dimethylaminopropyl)urea, dimethylpiperazine, 1,2-dimethylimidazole, 1-azabicyclo [3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine. Further suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the components (b) to (f).

If desired, further auxiliaries and/or additives (f) can be incorporated into the reaction mixture for producing the sound-absorbing and energy-absorbing flexible PUR foams of the present invention. Examples which may be mentioned are surface-active substances, foam stabilizers, cell regulators, fillers, dyes, pigments, flame retardants, hydrolysis inhibitors, fungistatic and bacteriostatic substances.

Suitable flame retardants are, for example, tricresyl phosphate, tris(2-chloroethyl) phosphate, tris(2-chloropropyl) phosphate, tetrakis(2-chloroethyl) ethylene diphosphate, dimethyl methanephosphonate, diethyl diethanolaminomethylphosphonate and also commercial halogen-containing flame retardant polyols. Besides the abovementioned halogen-substituted phosphates, it is also possible to use inorganic or organic flame retardants such as red phosphorus, hydrated aluminum oxide, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and, if desired, maize starch or ammonium polyphosphate, melamine and expandable graphite and/or aromatic or aliphatic polyesters for making the polyisocyanate polyaddition products flame resistant. Additions of melamine are found to be particularly effective. In general, it has been found to be advantageous to use from 5 to 50 parts by weight, preferably from 5 to 25 parts by weight, of the flame retardants mentioned per 100 parts by weight of the components (b) to (f).

Possible surface-active substances are, for example, compounds which serve to aid the homogenization of the starting materials and may also be suitable for regulating the cell structure of the plastics. Examples which may be mentioned are emulsifiers such as the sodium salts of castor oil sulfates or fatty acids and also amine salts of fatty acids, e.g. diethylamine oleate, diethanolamine stearate and diethanolamine ricinoleate, salts of sulfonic acids, e.g. alkali metal or ammonium salts of dodecylbenzene- or dinaphthyl-methanedisulfonic acid, and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. The surface-active substances are usually employed in amounts of from 0.01 to 5 parts by weight, based on 100 parts by weight of the components (b) to (f).

For the purposes of the present invention, fillers, in particular reinforcement fillers, are the customary organic and inorganic fillers, reinforcing materials, weighting agents, agents for improving the abrasion behaviour in paints, coating compositions, etc., known per se. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, and metal fibers and, in particular, glass fibers of various lengths which may be coated with a size. Examples of organic fillers are: carbon, rosin, cyclopentadienyl resins and graft polymers and also cellulose fibers, polyamide, polyacrylonitrile, polyurethane and polyester fibers based on aromatic and/or aliphatic dicarboxylic esters and, in particular, carbon fibers. The inorganic and organic fillers can be used individually or as mixtures and are advantageously incorporated into the reaction mixture in amounts of from 0.5 to 50% by weight, preferably from 1 to 40% by weight, based on the weight of the components (a) to (f), although the content of matts, nonwovens and woven fabrics of natural and synthetic fibers can attain values of up to 80% by weight.

Further details regarding the abovementioned further customary auxiliaries and additives may be found in the specialist literature, for example the monograph by J. H. Saunders and K. C. Frisch "High polymers", Volume XVI, polyurethanes, parts 1 and 2, Interscience publishers 1962 and 1964, or the above-cited Kunststoffhandbuch, polyurethane, Volume VII, Hanser-Verlag, Munich, Vienna, 1st to 3rd Editions.

To produce the sound-damping and energy-absorbing PUR foams of the present invention, the organic and/or modified organic polyisocyanates (a), the polyetherol mixture (b) and, if desired, further compounds (c) bearing hydrogen atoms which are reactive toward isocyanates are reacted in such amounts that the equivalence ratio of NCO groups of the polyisocyanates (a) to the sum of the reactive hydrogen atoms of the components (b) and, if used, (c) is 0.70–1.25:1, preferably 0.90–1.15:1.

In the process of the present invention, PUR foams are advantageously produced by the one-shot method, for example by means of the high-pressure or low-pressure technique, in open or closed molds, for example metallic molds. The continuous application of the reaction mixture onto suitable conveyor belts for producing slabstock foam is also customary.

It has been found to be particularly advantageous to employ the two-component method and to combine the formative components (b) to (f) to form a polyol component, often also referred-to as component A, and to use the organic and/or modified organic polyisocyanates (a), particularly preferably an NCO prepolymer or mixtures of this prepolymer and further polyisocyanates, and, if desired, blowing agents (d) as isocyanate component, often also referred to as component B.

The starting components are mixed at from 15 to 90° C., preferably from 20 to 60° C. and in particular from 20 to 35° C., and introduced into the open mold or, if desired under superatmospheric pressure, into the closed mold or, in the case of a continuous workstation, applied to a belt which accommodates the reaction mixture. Mixing can be carried out mechanically by means of a stirrer, by means of a stirring screw or by high-pressure mixing in a nozzle. The mold temperature is advantageously from 20 to 110° C., preferably from 30 to 60° C. and in particular from 35 to 55° C.

To be able to remove the foam from the mold without problems, it is generally necessary to use mold release agents. For environmental reasons, use is being increasingly made of enriched mold release agents having low solvent contents or mold release agents based on water.

The PUR foams produced by the process of the present invention (acoustic foams) have a density of from 10 to 800 kg/m$^3$, preferably from 60 to 100 kg/m$^3$. They have a sound-damping action.

The sound absorption is defined by the loss factor which is determined in accordance with ISO 7626, parts 1 and 2. The PUR foams produced by the process of the present invention have a loss factor of at least 0.3, preferably from 0.30 to 1.5.

They are particularly suitable as material for sound-damping purposes and are used, for example, as energy absorbers and for filling hollow spaces.

The present invention is illustrated by the examples below, without being restricted thereby.

EXAMPLES

A polyol composition (see Table 1) was foamed with the isocyanate mixture indicated in each case at the index indicated in each case.

TABLE 1

Composition of the acoustic foams and acoustic measurements

| | Example 1 | Example 2 | Example 3 | Example 4 | Example 5 | Comparative Example 6 | Comparative Example 7 |
|---|---|---|---|---|---|---|---|
| A component (in parts by weight) | | | | | | | |
| Lu 2047 | 71.03 | | 65.43 | 73.80 | 65.79 | 2.60 | 4.10 |
| Exp. 4398/1 | | 68.43 | | | | | |
| Lu 1000 | 13.40 | | 14.80 | 12.20 | 14.20 | 2.10 | |
| Lu 2002 | | 14.40 | | 2.30 | | | |
| Lu 2045 | 4.30 | | 5.20 | | 4.10 | 11.20 | 9.20 |
| Lu 2040 | | 5.10 | | 4.10 | | 78.28 | 81.40 |
| Triethanolamine | | | | | | 1.20 | 0.90 |
| Lu 2100 | | | | | 11.20 | | |
| VP 9236 | 5.30 | 6.20 | 9.50 | 3.30 | | | |
| Lu N201 | 0.20 | 0.22 | 0.22 | 0.30 | 0.26 | 0.35 | 0.30 |
| Lu N206 | 0.17 | 0.15 | 0.15 | 0.20 | 0.15 | 0.22 | 0.20 |
| DC 198 | | | 1.60 | 1.50 | 1.40 | | |
| B 8680 | | | | | | 0.85 | 0.60 |
| B 8409 | 2.50 | 2.50 | | | | | |
| Water | 3.10 | 3.00 | 3.10 | 2.30 | 2.90 | 3.20 | 3.30 |
| Index | 95 | 95 | 95 | 95 | 95 | 85 | 85 |
| B component | | | | | | | |
| Iso. mixture I | + | + | + | + | + | + | + |
| Iso. mixture II | | | | | | | |
| LF | 0.74 | 1.13 | 0.66 | 0.31 | 1.05 | 0.20 | 0.18 |
| StM (N/cm$^2$) | 93.20 | 42.10 | 98.20 | 10.50 | 5.60 | 13.10 | 13.90 |
| D (kg/m$^3$) | 79.70 | 73.80 | 72.30 | 74.20 | 73.10 | 72.30 | 71.10 |

D = density; StM = storage modulus; LF = loss factor
Lupranol ® 2047 OH number = 42 mg KOH/g, polyether alcohol based on propylene oxide and ethylene oxide (81% by weight) (BASF),
Exp. 4398/1 OH number = 43 mg KOH/g, polyether alcohol based on ethylene oxide, propylene oxide and butylene oxide (proportion of EO: 83% by weight) – experiment product
Lupranol ® 1000 OH number = 56 mg KOH/g, polyether alcohol based on propylene oxide (BASF),
Lupranol ® 2002 OH number = 42 mg KOH/g, polyether alcohol based on propylene oxide (BASF),
Lupranol ® 2045 OH number = 36 mg KOH/g, polyether alcohol based on propylene oxide and ethylene oxide (BASF),
Lupranol ® 2040 OH number = 28 mg KOH/g, polyether alcohol based on propylene oxide and ethylene oxide (BASF),
Lupranol ® 2100 OH number = 190 mg KOH/g, polyether alcohol based on ethylene oxide (BASF),
Lupranol ® VP 9236 OH number = 610 mg KOH/g, polyether alcohol based on ethylene oxide (BASF),
Lupragen ® N 201 Amine catalyst (BASF),
Lupragen ® N 206 Amine catalyst (BASF),
DC 198 Silicone stabilizer (Air Products),
B 8680, B 8409 Silicone stabilizer (Goldschmidt),
Iso. mixture I Mixture of Lupranat ® MES, Lupranat ® MI and Lupranat ® M20A, NCO content: 32.56% by weight,
Iso. mixture II Mixture of Lupranat ® MES, Lupranat ® MI and Lupranat ® M20A, NCO content: 33.08% by weight,
Lupranat ® MES Diphenylmethane 4,4'-diisocyanate (BASF),
Lupranat ® MI Mixture of diphenylmethane 4,4'-diisocyanate and diphenylmethane 2,4'-diisocyanate (BASF),
Lupranat ® M20A Diphenylmethane diisocyanate isomers (BASF).

The acoustic foams based on the polyol combination according to the present invention have a very good foam structure and good flow.

We claim:

1. A process for producing sound-damping and energy-absorbing flexible polyurethane foams comprising reacting organic and/or modified organic polyisocyanates (a) with a polyetherol mixture (b) in the presence of water and/or other blowing agents (d), catalysts (e) and, optionally, further auxiliaries and additives (f), wherein the polyetherol mixture (b) comprises b1) at least one bifunctional to eight-functional polyetherol based on ethylene oxide and a second alkylene oxide selected from the group consisting of propylene oxide, butylene oxide and mixtures thereof, where the proportion of ethylene oxide, based on the total amount of alkylene oxide used, is more than 40% by weight, and having an OH number of from 20 to 1000 mg KOH/g and a proportion of primary OH groups of greater than 50%, wherein at least one of said bifunctional to eight functional polyetherol has an OH number of from 20 to 100 mg KOH/g, b2) at least one bifunctional to six-functional polyetherol based on propylene oxide and/or butylene oxide and having an OH number of greater than 30 mg KOH/g and b3) at least one further polyetherol based on ethylene oxide and propylene oxide and having a proportion of primary OH groups of more than 25%, where the component b1) is used in a proportion of more than 30% by weight, based on the total weight of the polyetherol mixture (b).

2. A process as claimed in claim 1, wherein b1) further comprises at least one at least bifunctional polyetherol b1.2) having an OH number of from 101 to 250 mg KOH/g.

3. A process as claimed in claim 1 or 2, wherein b1) further comprises at least one at least bifunctional polyetherol b1.3) having an OH number of from 400 to 1000 mg KOH/g, where the proportion of ethylene oxide, based on the total amount of alkylene oxide used, is more than 70% by weight and the proportion of primary OH groups is more than 70%.

4. A process as claimed in claim 2, wherein b1.2) is used in a proportion of from 1 to 40% by weight, based on the total weight of the polyetherol mixture (b).

5. A process as claimed in claim 3, wherein b1.3) is used in a proportion of from 1 to 20% by weight, based on the total weight of the polyetherol mixture (b).

6. A process as claimed in claim 1, wherein b1) is used in a proportion of from 65 to 80% by weight, based on the total weight of the polyetherol mixture (b).

7. A process as claimed in claim 1, wherein b2) is used in a proportion of less than 40% by weight, based on the total weight of the polyetherol mixture (b).

8. A process as claimed in claim 1, wherein b3) is used in a proportion of less than 40% by weight, based on the total weight of the polyetherol mixture (b).

9. A process as claimed in claim 1, wherein the organic and/or modified organic polyisocyanates are selected from the group consisting of tolylene diisocyanate, mixtures of diphenylmethane diisocyanate isomers, mixtures of diphenylmethane diisocyanate and polyphenylpolymethylene polyisocyanate, tolylene diisocyanate with diphenylmethane diisocyanate, tolylene diisocyanate with polyphenylpolymethylene polyisocyanate and prepolymers formed by the reaction of the abovementioned isocyanates with the polyetherols b1) to b3).

10. A process as claimed in claim 1, wherein the organic and/or modified organic polyisocyanates comprise mixtures of diphenylmethane diisocyanate isomers having a proportion of 2,4'-diphenylmethane diisocyanate of greater than 10% by weight.

11. A process as claimed in claim 1, wherein water is used in a proportion of from 1 to 5 parts by weight, based on the total weight of the components (b) to (f).

12. A sound-damping and energy-absorbing flexible polyurethane foam comprising the reaction product of organic and/or modified organic polyisocyanates (a) with a polyetherol mixture (b) in the presence of water and/or other blowing agents (d), catalysts (e) and, optionally, further auxiliaries and additives (f), wherein the polyetherol mixture (b) comprises b1) at least one bifunctional to eight-functional polyetherol based on ethylene oxide and a second alkylene oxide selected from the group consisting of propylene oxide, butylene oxide and mixtures thereof, where the proportion of ethylene oxide, based on the total amount of alkylene oxide used, is more than 40% by weight, and having an OH number of from 20 to 1000 mg KOH/g and a proportion of primary OH groups of greater than 50%, wherein at least one of said bifunctional to eight functional polyetherol has an OH number of from 20 to 100 mg KOH/g, b2) at least one bifunctional to six functional polyetherol based on propylene oxide and/or butylene oxide and having an OH number of greater than 30 mg KOH/g and b3) at least one further polyetherol based on ethylene oxide and propylene oxide and having a proportion of primary OH groups of more than 25%, where the component b1) is used in a proportion of more than 30% by weight, based on the total weight of the polyetherol mixture (b).

13. A sound-damping and energy-absorbing flexible polyurethane foam as claimed in claim 12 which has a loss factor of from 0.30 to 1.5.

14. A polyetherol mixture (b) useful in production of sound-damping and energy-absorbing flexible polyurethane foams, wherein the polyetherol mixture comprises b1) at least one bifunctional to eight-functional polyetherol based on ethylene oxide and a second alkylene oxide selected from the group consisting of propylene oxide, butylene oxide and mixtures thereof, at least one of said bifunctional to eight-functional polyetherol being an at least bifunctional polyetherol having an OH number of from 20 to 100 mg KOH/g, wherein b 1) has an OH number of from 20 to 1000 mg KOH/g, a proportion of ethylene oxide, based on the total amount of alkylene oxide used, greater than 40% by weight, and a proportion of primary OH groups of greater than 50%, and b2) at least one bifunctional to six-functional polyetherol based on propylene oxide and/or butylene oxide and having an OH number of greater than 30 mg KOH/g and b3) at least one further polyetherol based on ethylene oxide and propylene oxide and having a proportion of primary OH groups of more than 25%, where the component b1) is used in a proportion of more than 30% by weight, based on the total weight of the polyetherol mixture (b).

15. The polyetherol mixture of claim 14, wherein a portion of b1) is comprised of at least one at least bifunctional polyetherol b1.2) having an OH number of 190 to 400 mg KOH/g.

16. The polyetherol mixture of claim 14, wherein a portion of b1) is comprised of at least one at least bifunctional polyetherol b1.3) having a proportion of primary OH groups of more than 70%, a proportion of ethylene oxide, based on the total amount of alkylene oxide used in b1.3), of more than 70% by weight and an OH number of from 400 to 1000 mg KOH/g.

17. A polyetherol mixture useful in production of sound-damping and energy-absorbing flexible polyurethane foams, wherein the polyetherol mixture comprises:

1) at least one bifunctional to eight-functional polyetherol based on propylene oxide and/or butylene oxide, and ethylene oxide, where the proportion of ethylene oxide, based on the total amount of alkylene oxide used, is more than 40% by weight, and having an OH number of from 20 to 1000 mg KOH/g and a proportion of primary OH groups of greater than 50%, wherein at least one of said bifunctional to eight-functional polyetherol comprises an at least bifunctional polyetherol having an OH number of from 20 to 100 mg KOH/g and based on an initiator substance selected from the group consisting of glycerol, trimethylolpropane, sorbitol, and mixtures thereof, 2) a bifunctional to six-functional polyetherol based on propylene oxide and/or butylene oxide and having an OH number of greater than 30 mg KOH/g and 3) a further polyetherol based on ethylene oxide and propylene oxide and having a proportion of primary OH groups of more than 25%, where 1) is used in a proportion of more than 30% by weight, based on the total weight of the polyetherol mixture.

18. The polyetherol mixture of claim 17, wherein a portion of 1) is comprised of at least one at least bifunctional polyetherol having an OH number of from 40 to 250 mg KOH/g and based on an initiator substance selected from the group consisting of ethylene glycol or diethylene glycol, and mixtures thereof.

* * * * *